INVENTORS
BARBOUR L. PERRY
ALAN W. BALDWIN
HENRY P. BIRMINGHAM

United States Patent Office 3,447,129
Patented May 27, 1969

3,447,129
AIRCRAFT DEPTH-OF-FLASH OPTICAL
GUIDANCE SYSTEM
Henry P. Birmingham, 1311 Gatewood Drive, and
Barbour Lee Perry, 6641 Wakefield Drive, both of
Alexandria, Va. 22307, and Alan W. Baldwin,
216 Panorama Drive, Oxon Hill, Md. 20021
Filed June 17, 1966, Ser. No. 559,348
Int. Cl. G08g 5/02
U.S. Cl. 340—26     11 Claims The invention described herein may be manufactured and used by or for the Government of the United States of America for governmental purposes without the payment of any royalties thereon or therefor.

The present invention relates to optical guidance systems and more particularly to a system hereinafter called Depth-of-Flash Optical Landing System (DFOLS), for visually aiding a pilot in landing an aircraft.

Visual landing aids are extensively used for providing pilots with information indicative of glide path angle when making landings. One such device utilizing a multi-colored light projection pattern provides qualitative information to the viewer indicative of whether the craft is above or below glide path.

Serious limitations in the prior art devices have been found because of the need for visual guidance signals capable of giving the viewer quantitative as well as qualitative information. A further short coming of prior art devices is the lack of provision of a guidance signal capable of being interpreted so as to provide rate or anticipatory information at ranges from touchdown great enough to be useful. A pilot using the older systems would be provided with information indicative only of whether he was on or off vertical glide path but with little, or very poor indication of whether he was going away from or returning to the proper glide path. Thus a pilot seeing that he was off glide path would attempt to guide the vehicle towards the on-glide area, frequently over shooting the proper angle as a result of an over correcting response to the original off-glide path signal. Subsequently the pilot, viewing this off-glide path signal, would attempt to return the vehicle back to the on-glide path angle, again overcorrecting and thus a flying pattern of oscillation into and out of the on-glide path area would result. Obviously visual signals of this type do not provide optical guidance information enabling the pilot to maintain a steady on-glide path flight pattern required for safe landings of aircraft on strategic landing facilities.

The general purpose of this invention is to provide an optical guidance system for giving information indicative of angle of deviation from a predetermined reference angle using "Depth-of-Flash" principles comprising a light projection means located at a point of reference for projecting a multicolored light pattern towards a viewer and a pattern-characterizing means disposed in the path of said projected light and operable upon the pattern to establish its characteristic such that a predetermined one of the light colors appears steady to the viewer when the vehicle is on the predetermined course while the others of the colors appear to the viewer to flash with variable depths when the viewer is out of the predetermined reference angle, the variable flash depths being a function of the deviation from on-reference angle such that the light appears more steady as the vehicle approaches the predetermined reference angle area.

An object of the present invention is the provision of a simple, easy to interpret, accurate optical guidance system for use in controlling the vertical position of aircraft on the final landing approach.

Another object of the invention is a provision of a simple, easy to interpret, accurate optical guidance system for use in controlling the vertical position in aircraft on the final landing approach.

Another object of the invention is a provision of an optical guidance system utilizing fundamental concepts of "Depth-of-Flash" to provide readily perceivable visual signals.

Still another object of the invention is to provide an optical guidance system utilizing principles of "Depth-of-Flash" to provide indicia representative of glide path error to pilots for enabling guided landing of rapidly moving aircraft.

Still another object of the invention is to provide an optical guidance system utilizing principles of "Depth-of-Flash" to provide quantitative indicia of such sensitivity that the pilot is enabled to infer his glide path error rate even at ranges from touchdown of the order of several miles.

Still another object of the invention is to provide such indicia to the pilot, without the sensing of aircraft position, by means of equipment located on the ground and without the need for sensing or transmitting to the ground, parameters relevant to the aircraft flight.

Yet another object of the invention is to provide a small, compact and relatively inexpensive optical device suitable for use in aircraft landing ports of the smallest, as well as largest, size, for continually giving the approaching pilot accurate and quick, yet readily perceivable, information for determining the quantitative vertical location of the aircraft relative to the desired glide path.

With these and other objects in view, as will hereinafter more fully appear, and in which will be more particularly pointed out in the appended claims, reference is now made to the following description taken in connection with the accompanying drawings in which:

Figure 1:
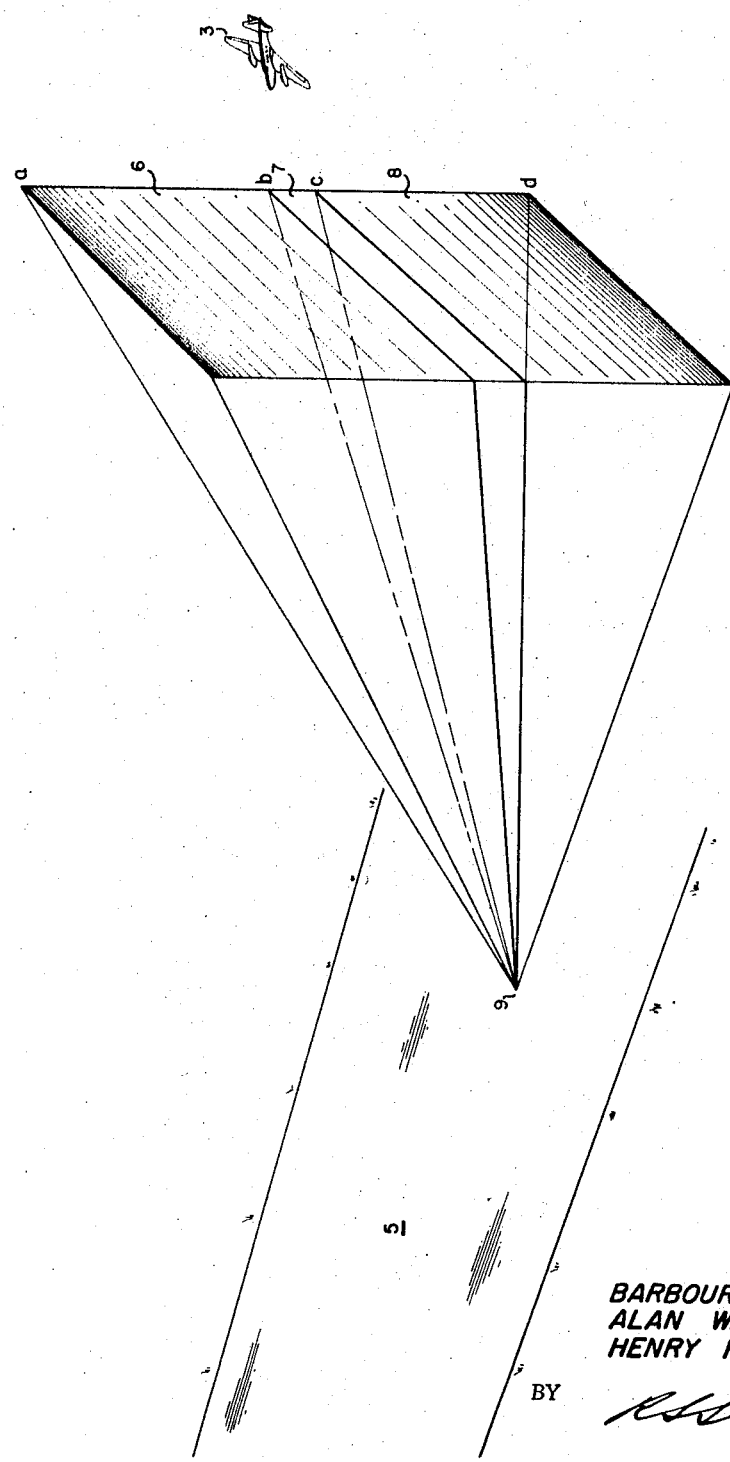
FIG. 1 is a pictorial representation of the pattern of light projected by the instant system.

Referring now to the drawings wherein like reference characters designate like or corresponding parts throughout the several views, there is shown in FIG. 1 a three dimensional illustration typical of the projected pattern of light used to guide a pilot in the landing of aircraft 3 on landing strip 5. Although, as is more clearly shown in FIG. 4, the light source from point 9, in most embodiments of the invention, provides two separate overlapping beams that appear to the pilot as a single light source, for purposes of illustration, there is shown to be a single source of light emanating from the single point 9 due to the close positioning, relative to each other, of the sources in situ. Projected patterns 6, 7 and 8 are colored green, amber (or white) and red respectively so as to provide the pilot with a readily visible signal indicative of the zone which he is in.

In the operation of the invention, as the craft 3 approaches the light pattern, it will enter into one of the three zones, depending on its vertical position relative to the pattern. If it should enter the pattern in zone 6, the pilot will see a flashing green light and, having knowledge of the system utilized, he will know that the craft is above the desired flight path and that he must descend. As the craft descends, the flashing effect gradually diminishes such that as the craft is about to enter will continue to be on it as long as he sees a steady until the craft enters zone 7, at which time the light seen by the pilot will be steady amber, or white, which indicates that the craft is now on the desired glide path and will continue to be on it as long as he sees a steady amber or white light. On the other hand, if the craft enters zone 8, the pilot will see a blinking red light and know that the craft is below the desired glide path. As the craft ascends, the same effect takes place as aforedescribed until the craft enters zone 7. If perchance the craft initially enters zone 7, the pilot will see a steady amber light and will guide the craft to landing by directing the craft so as to continue to see the steady amber light. It is to be noted that the pilot will see a more intensive flashing effect when the craft is nearer to *a* or *d* than he will see if the craft is nearer to *b* or *c*. The aforedescribed phenomena seen by the pilot may be expressed as a "Depth-of-Flash" and are achieved in accordance with the invention by means hereinafter fully described. The expression "Depth-of-Flash," as herein used, is defined as the relative change in intensity of a flashing light source from its bright state to its dim state of the flashing cycle, as compared to its bright state; or it may be defined, in terms of the percent of modulation of the light signal.

Figure 2:
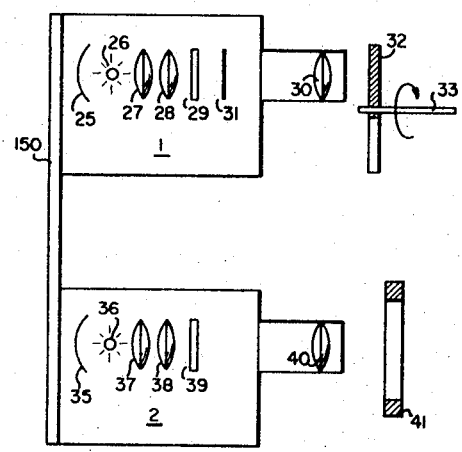
FIG. 2 illustrates a top plan view of one embodiment of the invention using two projectors.

FIG. 2, directed to a basic embodiment of the invention, shows an arrangement utilizing a pair of light projectors, indicated generally as 1 and 2. Although the projectors are shown in separated housings securely affixed to each other by means 150, they may be housed in a single enclosure adjustable mounted on a base in close proximity with each other. Projector 1, operating conventionally, contains a source of light 26 and a reflector 25 for directing the light from said source through condensing lenses 27 and 28. A multicolored slide 29 (shown in more detail in FIG. 4) and a shadow bar 31 are positioned in the path of the light which then passes through main projection lens 30. Rotatable disc 32 has a quarter-section removed from it and is driven by a motor (not shown) connected to mechanical shaft 33 for rotation. This rotating disc permits light to pass one-quarter of the time in a cycle and acts to provide the "Flash" aspect of the instant device.

Projector housing 2 contains identical elements as housing 1, namely, light source 36, reflecting its light to a reflector 35. The light is then passed through lenses 37 and 38, and subsequently through multicolored slide 39, where it is then passed through main projection lens 40 and projected towards the shadow forming means. It should be noted that there is no rotating disc in front of light source in projector housing 2. The beam patterns of light projected from both sources of projector housings 1 and 2 overlap almost completely and the resulting image will be one flashing pattern appearing to superimpose itself upon a constant pattern of light, resulting in a "Depth-of-Flash" optical landing pattern like that shown in FIG. 1.

Figure 3A:
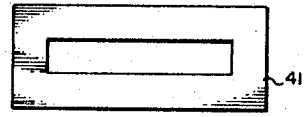
FIGS. 3A and 3B show the shadow forming means used in the projectors shown in FIG. 2.
Figure 3B:
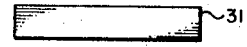

FIGS. 3A and 3B show the shadow forming means 41 and 31 used in projectors 2 and 1, respectively, of FIG. 2. They are made of any solid material capable of preventing the passage of light.

Figure 4A:
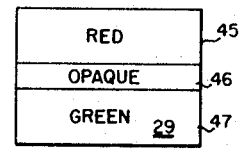
FIGS. 4A and 4B show the slides used with the projectors of the instant invention.

FIG. 4A illustrates the color scheme of slide 29 used in projector housing 1. The upper section 34 is red, the middle section 46 opaque, and the lower section 47 green.

Figure 4B:
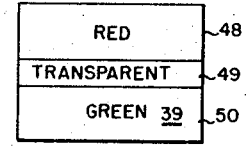

FIG. 4B shows a color scheme of slide 39 used in projector housing 2. Its upper section 48 is red, its middle section 49 transparent (or amber) and its lower section 50 green.

In FIGS 4A and 4B particular color schemes have been illustrated but any other suitable combination of colors which provide readily perceivable visual information may be used.

Figure 5:
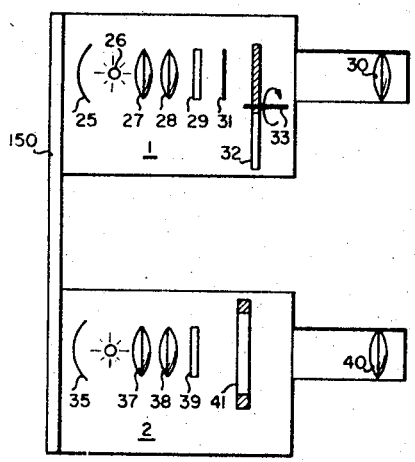
FIG. 5 shows a top plan view of another embodiment of the invention utilizing internally housed shadow forming means.

FIG. 5 shows a modification of the embodiment of the invention shown in FIG. 2 having identical elements except that the flash disc for the first source of light in housing 1 is located between the slide 29 and main lens 30 instead of between main lens 30 and the pilot's eye. Also, the shadow forming means in housing 2 is located between the slide and its main lens.

Figure 6A:
FIGS. 6A and 6B show the graduated filters used in place of the shadow bars in one modification of the invention.
Figure 6B:
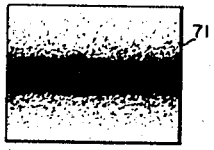

FIGS. 6A and 6B show graduated filter means 70 and 71 which can be used in place of the respective shadow forming means shown in FIGS. 3A and 3B. Filter 70 is clear in the center portion and gradually darker towards the outer edge, while filter 71 is dark in the center and gradually clearer towards the edges. The filters are functionally equivalent to the shadow forming means in FIGS. 3A and 3B and may be used in place of them in FIGS. 2, 5, 7 and 8.

Figure 7:
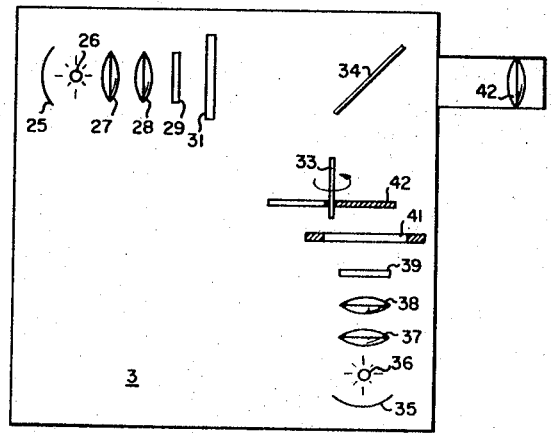
FIG. 7 shows a schematic of another embodiment of the device using a unitary assemblage with a half-silvered mirror.

FIG. 7 shows another modification of the embodiment of the invention shown in FIG. 2 having identical elements except that a single housing 3 and lens 42 replace the housings 1 and 2, and main lenses 30 and 40, respectively. This is accomplished by locating the projectors at a 90° angle relative to each other while using a properly located half-silvered mirror 34 to pass the light pattern from only one source while reflecting the light pattern from the other source. Thus the arrangement permits the use of a single housing and one main lens to accomplish the same results as the basic system.

Figure 8:
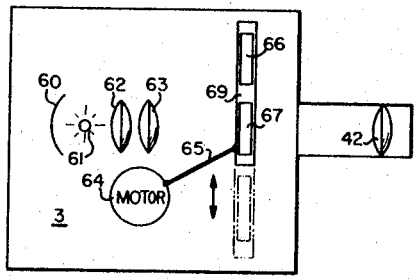
FIG. 8 shows the embodiment of the invention employing reciprocating slides.

FIG. 8 shows a modification of an embodiment of the basic device wherein a single source of light with a reciprocating slide arrangement is used. Housing 3 has a source of light 61 and a reflector 60 for directing light from the source to lenses 62 and 63, and subsequently to reciprocating slides 66 and 67 the latter of which are somewhat different from the slides of FIGS. 4 and 6 which are used concurrently, rather than alternately, to pass the light. Slide mount 69 is reciprocally driven by motor 64 with mechanical linkage 65 acting to connect the two. Light from source 61 is ultimately passed through lens 42 and the beam pattern will be substantially the same as those discussed in connection with the previous embodiments of the device. In other words, as the slide mount 69 reciprocates back and forth between its two extreme positions a "Flashing" effect is produced on the image from light source 61 and, when used in connection with multi-colored slides 66 and 67 a coded signal indicative of glide path angle of error is produced.

*Theory and operation of the "depth-of-flash" landing system*

Since the basic theory behind all embodiments is the same only the embodiments using a rotating sector disc and two light sources will be discussed. In all of the embodiments, namely those shown in FIG. 2, FIG. 5, FIG. 7, with the exception of FIG. 8, there are shown two light sources, light from each passing through a multi-colored slide for projection toward an aircraft pilot making a landing. The projected patterns are parallel, one to the other, and each is coded such that the overlapping images provide an inexpensive, easy to interpret and safe optical landing system. Other features to keep in mind in understanding the operation of this system are (1) the rotating sector disc, in front on the first source of light, having 25% of its area removed to permit light to pass only ¼ of the time in a cycle, and (2) the shadow forming means in front of each light source, with said means in front of the first projector beam defocused so as to provide 100% darkness at the center graduated to 100% light at the outer edges, the shadow forming means defocused in front of the other source of light and having its center section removed to provide a graduated shadow from 100% darkness at its outer edges to 100% light at its center. The shadow forming means, then, is used to provide a gradation of intensity in the projected image from the projector with which it is employed, and the degree of this gradation is dependent upon location of the shadow forming means with respect to its associated projection lens.

When the aircraft is in a position of large angular error with respect to the glide path, light reaching the pilot's eye comes only from the projector utilizing the rotating sector disc due to operation of the shadow forming means of the uninterrupted projector and thus appears to be completely flashing. When the aircraft is on or close to glide path, his eye receives light only from the uninterrupted projector, due to the shadow forming means in the projector utilizing the rotating sector disc. With an intermediate positional error of the aircraft, some light is received from both projectors due to the graded effect resulting from the location of each shadow forming means.

Thus the combined light pattern as seen by the pilot has its upper and lower extremes appearing to flash vigorously while the light projected near the center is, and appears to be, virtually constant in intensity. In this center portion of the pattern there is a small area of a different color from either the upper or lower part of the pattern which serves as "on glide path" indicator. In the system illustrated, the upper portion is green and the lower portion red, both "flashing" with a "depth" that is a function of error from glide path, i.e., steady red when just slightly low, then beginning to flash more and more perceptibly or vigorously as the error increases.

A pilot making his aproach, for example, may be very high above glide path. He sees a flashing green light. He increases his sink rate, and as he approaches the glide path the green light gradually appears to lose its "flashing" characteristic and becomes a steady green just before he reaches the glide path, at which time the light appears to turn steady white (or a steady amber) color. In similar fashion, if he goes slightly below glide path he will see a steady red image, and if he goes further below, the image will appear to lose its steady characteristic and becomes a deeply pulsating red as he goes considerably below glide path. It can be seen, that although the coded information received by the pilot is indicative of quantity of angle of error at a given time $T_0$, such information is readily capable of being used to "mentally" determine rate of angle of error. This is due to the fact that an instant of time after $T_0$, for example, $T_1$, the pilot will view a signal giving quantitative angle of error at the new position. Since the interval of time between $T_0$ and $T_1$ is relatively short, the pilot will have no difficulty in remembering the signal given at $T_0$ at least until $T_1$ so as to be able to make a mental comparison of the two quantitative bits of information. Thus it can be seen that the pilot will have access to coded information indicative of flight path error which is not only quantitive but is capable of being used in rate of change determination. It is this aspect of the device which enables the pilot to anticipate his entrance into the glide path area so as to prevent "overshooting." Furthermore when flying under landing conditions where it is undesirable for the pilot to rely on absolute command signals which preclude any type of human judgment, this system provides a command signal which utilizes the pilot's sense of judgment while reducing to a minimum the possibilities of his misjudgment due to fatigue, mistake, etc., so as to obtain maximum safety in landings.

Thus, the instant invention is a "Depth-of-Flash" optical landing system providing a safe, easy to interpret, accurate and an inexpensive guidance system for use in the vertical control of aircraft on final landing approach.

Although particular arrangements of the light sources, reflectors, lenses, slides, shadow forming means, rotating discs, etc., are shown, many other arrangements well known to one skilled in the optics art are contemplated within the scope of this invention. For example, the system shown in FIG. 8 might employ a reciprocating shadow forming means in place of the slide arrangement shown. Furthermore, the system is capable of being used in the guidance of vehicles other than aircraft, and of vehicles in media other than air and as a lateral angle guidance system by turning the device 90° on its side.

What is claimed and desired to be secured by Letters Patent of the United States is:

1. An optical guidance system for enabling the pilot of a vehicle to direct the vehicle to follow a predetermined course to a point of reference, comprising:
   light projection means at said point of reference for projecting a multicolored light pattern, and
   pattern characterizing means disposed in the path of said projected light pattern and operable upon said pattern to establish its characteristic so that a predetermined one of said light colors appears steady to the pilot when the vehicle is on said predetermined course while the others of said colors appear to the pilot as colors of variable flash depths when the vehicle is off said predetermined course, said variable flash depths being a function of the deviation from one course such that the colored light appears more steady as the vehicle approaches said predetermined course.

2. The device as defined in claim 1, wherein:
   the light projection means comprises two separate sources of light located adjacent to each other having their respective beams of light overlapping at a very short distance from the point of reference.

3. The device as defined in claim 2, wherein:
   the pattern characterizing means comprises:
   a first shadow forming means located between the first source of light and the pilot,
   a nontransparent rotatable sector disc having a section of its area removed, said disc also being located between said first source of light and the pilot's eye, and
   a second shadow forming means being located between the second source of light and the pilot, said first shadow forming means acting to provide the beam of light projected from said first source of light with 100% darkness at the center graduated to 100% light at the outer edges, said second shadow forming means acting to provide the beam of light projected from said second source of light with 100% darkness at the outer edges graduated to 100% light at the center.

4. The device as defined in claim 3, wherein:
   each shadow forming means is a graded filter.

5. The device as defined in claim 2, wherein:
   separate housings are located adjacent each other containing a respective one of said sources of light,
   at least one lens is located immediately adjacent each of said sources of light,
   a multicolored slide is located adjacent each of said at least one lens for projecting a multicolored beam of light therefrom, and
   a respective main lens is located within an opening in each of said containers at the end opposite the source of light.

6. The device as defined in claim 5, wherein:
   the pattern characterization means comprises;
   a first shadow forming means located between the multicolored slide in the first of said housings and the main lens therein;
   a nontransparent rotatable sector disc having a section of its area removed, said disc being located between said first main lens and the pilot's eye, and
   a second shadow forming means being located between the main lens in the second of said housing and the pilot's eye.

7. The device as defined in claim 5, wherein:
the pattern characterizing means comprises;
a first shadow forming means located between the multicolored slide in the first of said housing and the main lens therein;
a nontransparent rotatable sector disc having a section of its area removed, said disc being located between said first main lens and the pilot's eye, and
a second shadow forming means being located between the multicolored slide in the second of said housings and the main lens therein.

8. The device as defined in claim 1, wherein:
the light projection means comprises;
a single housing having two sources of light positioned therein, each source of light having its beam focused towards and at an angle of 90° relative to the other,
a main lens position opposite a first of said light sources for transmitting light from said light sources therethru, and
a half-silvered mirror positioned at a 45° angle relative to the axes of said beams of light and being adjacent said main lens and having its silvered side facing the second of said sources of light such that the light from both of said sources will be directed to said main lens.

9. The device as defined in claim 8, wherein:
the pattern characterizing means comprises;
a first shadow forming means positioned between said first source of light and said half-silvered mirror,
a second shadow forming means positioned between said second source of light and said half-silvered mirror, and
a rotatable sector disc positioned between said second shadow forming means and said half-silvered mirror.

10. The device as defined in claim 1, wherein:
the light projection means comprises;
a single elongated housing,
a source of light positioned within said housing at one of its ends,
an opening in said housing at the end opposite said first end in that alignment with the axis of the beam of light emanating from said source of light so as to permit passage of light therethru, and
the pattern characterizing means comprises;
a slide means positioned between said source light and said opening, said slide being movable between two positions,
two multicolored slides mounted adjacent on said slide means and positioned adjacent each other such that when the slide means is in either of said two positions the light from said source will be transmitted through either one slide or the other such that rapid reciprocal movement of said slide means will result in a pattern characterization.

11. The device as defined in claim 1, wherein:
the pattern characterizing means includes a shadow forming means disposed in the path of projected light whereby the intensity gradation within the projected pattern is predeterminable and manipulatable by selective location of said shadow forming means.

References Cited

UNITED STATES PATENTS 3,191,146    6/1965    Mitchell _____ 340—26

ALVIN H. WARING, *Primary Examiner.*

U.S. Cl. X.R.

240—1.2; 340—29